US 8,045,232 B2

(12) United States Patent
Kinoshita

(10) Patent No.: US 8,045,232 B2
(45) Date of Patent: Oct. 25, 2011

(54) IMAGE DISPLAY MEDIUM, METHOD AND SYSTEM FOR PREPARING COMPOSITE IMAGE DISPLAY DATA

(75) Inventor: Koji Kinoshita, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 1125 days.

(21) Appl. No.: 11/782,946

(22) Filed: Jul. 25, 2007

(65) Prior Publication Data

US 2008/0024803 A1  Jan. 31, 2008

(30) Foreign Application Priority Data

Jul. 27, 2006 (JP) .................... 2006-205233

(51) Int. Cl.
  G06K 15/00 (2006.01)
  H04N 1/405 (2006.01)
  H04N 1/407 (2006.01)
  H04N 1/50 (2006.01)
  H04N 1/54 (2006.01)
  B42D 15/00 (2006.01)

(52) U.S. Cl. ........ 358/3.06; 358/1.9; 358/3.09; 358/3.1; 358/3.11; 358/3.12; 358/3.28; 358/3.3; 358/3.31; 358/533; 358/534; 358/536; 358/540; 283/72; 283/93

(58) Field of Classification Search .......... 358/1.9, 358/3.06, 3.09, 3.1, 3.11, 3.12, 3.28, 3.3, 358/3.31, 533, 534, 536, 540; 283/72, 93

See application file for complete search history.

(56) References Cited

U.S. PATENT DOCUMENTS

| | | | | |
|---|---|---|---|---|
| 4,579,370 A * | 4/1986 | Corwin et al. ................ | 283/72 |
| 4,962,431 A * | 10/1990 | Imakawa et al. ............. | 358/296 |
| 5,075,562 A * | 12/1991 | Greivenkamp et al. .. | 250/559.05 |
| 6,275,621 B1 * | 8/2001 | Terry ......................... | 382/289 |
| 6,768,558 B1 * | 7/2004 | Yamashita et al. .......... | 358/1.18 |
| 6,859,534 B1 * | 2/2005 | Alasia ......................... | 380/51 |
| 6,865,001 B2 * | 3/2005 | Long et al. .................. | 359/2 |
| 7,031,493 B2 * | 4/2006 | Fletcher et al. ............. | 382/100 |
| 7,194,105 B2 * | 3/2007 | Hersch et al. ............... | 382/100 |
| 7,287,284 B2 * | 10/2007 | Hayashi ....................... | 726/32 |
| 7,339,599 B2 * | 3/2008 | Hayashi ....................... | 345/629 |
| 7,609,989 B2 * | 10/2009 | Harada ........................ | 399/80 |
| 2003/0137145 A1 * | 7/2003 | Fell et al. .................... | 283/72 |
| 2003/0161040 A1 * | 8/2003 | Ishii et al. .................... | 359/463 |

(Continued)

FOREIGN PATENT DOCUMENTS

| | | |
|---|---|---|
| JP | 64-5835 | 1/1989 |
| JP | 2-208784 | 8/1990 |
| JP | 2-51742 | 11/1990 |
| JP | 08-244389 | * 9/1996 |

(Continued)

*Primary Examiner* — Chan S Park
*Assistant Examiner* — Beniyam Menberu
(74) *Attorney, Agent, or Firm* — Oblon, Spivak, McClelland, Maier & Neustadt, L.L.P.

(57) ABSTRACT

An image display medium displays an image including a first region having a first composite image. The first composite image includes a first display image and a first latent image. The first display image includes at least one of a first halftone dot image and a first line image having a first linearity. The first halftone dot image and the first line image have such densities as are not reproduced by copying. The first latent image includes at least one of a second halftone dot image and a second line image having a second linearity. The second halftone dot image and the second line image have such densities as are not reproduced by copying. The first and second linearities produce different moiré patterns when the first display and the first latent images are enlarged by a first common optical system.

19 Claims, 5 Drawing Sheets

U.S. PATENT DOCUMENTS

| | | | |
|---|---|---|---|
| 2004/0114190 A1* | 6/2004 | Man | 358/3.28 |
| 2005/0078974 A1* | 4/2005 | Uchida et al. | 399/81 |
| 2005/0078993 A1* | 4/2005 | Oomura et al. | 399/366 |
| 2005/0219599 A1* | 10/2005 | White et al. | 358/1.14 |
| 2006/0003295 A1* | 1/2006 | Hersch et al. | 434/110 |
| 2006/0087672 A1* | 4/2006 | Fujii | 358/1.14 |
| 2006/0242418 A1* | 10/2006 | Willamowski et al. | 713/176 |
| 2007/0003294 A1* | 1/2007 | Yaguchi et al. | 399/15 |
| 2007/0041611 A1* | 2/2007 | Hersch et al. | 382/100 |
| 2007/0047036 A1 | 3/2007 | Kinoshita | |
| 2007/0139714 A1* | 6/2007 | McElvain | 358/3.06 |
| 2010/0021002 A1* | 1/2010 | Yogo et al. | 382/100 |

FOREIGN PATENT DOCUMENTS

| | | | |
|---|---|---|---|
| JP | 2695523 | | 9/1997 |
| JP | 2001-010199 | * | 1/2001 |
| JP | 2001-324898 | | 11/2001 |
| JP | 2001-358931 | | 12/2001 |
| JP | 2003-167694 | | 6/2003 |
| JP | 2003-196210 | | 7/2003 |
| JP | 2004-139158 | | 5/2004 |
| JP | 2005-079628 | * | 3/2005 |
| JP | 2005-115874 | | 4/2005 |
| JP | 2006-121518 | | 5/2006 |
| JP | 3854827 | | 9/2006 |

* cited by examiner

PURCHASE PICE IS ▨ 90

YOUR IDENTIFICATION NUMBER IS ▨ 91

IMAGE DISPLAY MEDIUM, METHOD AND SYSTEM FOR PREPARING COMPOSITE IMAGE DISPLAY DATA

CROSS-REFERENCE TO RELATED APPLICATION

This patent specification is based on and claims priority from Japanese Patent Application No. 2006-205233 filed on Jul. 27, 2006 in the Japan Patent Office, the entire contents of which are incorporated by reference herein.

BACKGROUND OF THE INVENTION

1. Field of the Invention

The present invention relates to a medium, a method and a system for composite image formation. More particularly, the present invention relates to an image display medium capable of displaying a composite image including a display image and a latent image, and a preparation method and a generation system for preparing composite display image data.

2. Description of the Related Art

Recent technological advances in various fields such as image forming and image processing have made it harder to distinguish an original from a duplicate of the original.

In one example, an attempt is made to distinguish an original from a duplicate by using an image processing apparatus capable of detecting a counterfeit or alteration of an image on ordinary paper. The image processing apparatus sequentially generates a character image from a character code, a background pattern from character information, and a composite image including the character image and the background pattern and sends the composite image to a thermal printer so that the composite image is printed. Since the background pattern is formed in such a manner as not to be in contact with the character image, deletion from and addition to the original can be easily identified.

Other examples attempt to distinguish between an original and a duplicate of the original by using ground tint patterns, which are visible in the original while invisible in the duplicate or vice versa. The original includes a display image and a latent image. Each of the display image and the latent image has a halftone dot image with a different density. For example, at least one area of the latent image includes relatively large dots while at least one area of the display image includes relatively small dots. When the original is copied, the large-dot area of the latent image becomes clearly visible while the small-dot area of the display image is omitted (i.e., becomes invisible), thus making it possible to determine if the image is an original or a duplicate.

However, the latent image has to be positioned across the entire page of the original to form a visible area and/or an omitted area with relatively large-sized characters, which limits the number of characters that can be displayed. Specifically, only simple words such as "COPY PROHIBITED" can be used. In addition, such characters cannot be used as text characters.

SUMMARY OF THE INVENTION

According to an aspect of the invention, an image display medium displays an image that includes a first region having a first composite image. The first composite image includes a first display image and a first latent image. The first display image includes at least one of a first halftone dot image and a first line image having a first linearity. The first halftone dot image and the first line image have such densities as are not resolved (reproduced) by copying. The first latent image is incorporated into the first display image, and includes at least one of a second halftone dot image and a second line image having a second linearity. The second halftone dot image and the second line image have such densities as are not reproduced by copying. The first linearity and the second linearity produce different moiré patterns when the first display image and the first latent image are enlarged by a first common optical system.

According to another aspect of the present invention, a method of preparing composite image display data for displaying a first composite image in a first region and a second composite image in a second region includes an obtaining step, a first generating step and a second generating step.

The obtaining step obtains data relating to a first display image of the first composite image, a first latent image of the first composite image, a second display image of the second composite image, and a second latent image of the second composite image. The first display image of the first composite image includes at least one of a first halftone dot image and a first line image having a first linearity. The first latent image of the first composite image includes at least one of a second halftone dot image and a second line image having a second linearity. The second display image of the second composite image includes at least one of a third halftone dot image and a third line image having a third linearity. The second latent image of the second composite image includes at least one of a fourth halftone dot image and a fourth line image having a fourth linearity.

The first generating step generates image data of the first region displaying the first composite image including the first display image and the first latent image based on the data relating to the first display image and the first latent image. The first linearity and the second linearity produce different moiré patterns when the first display image and the first latent image are enlarged by a first common optical system. The first region includes the first halftone dot image, the first line image, the second halftone dot image and the second line image, which have such densities as are not reproduced by copying.

The second generating step generates image data of the second region displaying the second composite image of the second display image and the second latent image based on the data relating to the second display image and the second latent image. The third linearity and the fourth linearity produce different moiré patterns when the second display image and the second latent image are enlarged by a second optical system. The second region including the third halftone dot image, the third line image, the fourth halftone dot image and the fourth line image, which have such densities as are reproduced by copying.

According to still another aspect of the invention, an image generation system preparing composite image display data for displaying a first composite image in a first region and a second composite image in a second region includes a first mechanism and a second mechanism.

The first mechanism obtains data relating to a first display image of the first composite image, a first latent image of the first composite image, a second display image of the second composite image, and a second latent image of the second composite image. The first display image of the first composite image includes at least one of a first halftone dot image and a line image having a first linearity. The first latent image of the first composite image includes at least one of a second halftone dot image and a second line image having a second linearity. The second display image of the second composite image includes at least one of a third halftone dot image and a third line image having a third linearity. The second latent image of the second composite image includes at least one of a fourth halftone dot image and a fourth line image having a fourth linearity.

The second mechanism generates image data of the first region displaying the first composite image including the first display image and the first latent image based on the data relating to the first display image and the first latent image. The first linearity and the second linearity produce different moiré patterns when the first display image and the first latent image are enlarged by a first optical system. The first region includes the first halftone dot image, the first line image, the second halftone dot image and the second line image, which have such densities as are not reproduced by copying.

The second mechanism further generates image data of the second region displaying the second composite image including the second display image and the second latent image based on the data relating to the second display image and the second latent image. The third linearity and the fourth linearity produce different moiré patterns when the second display image and the second latent image are enlarged by a second optical system. The second region includes the third halftone dot image, the third line image, the fourth halftone dot image and the fourth line image, which have such densities as are reproduced by copying.

BRIEF DESCRIPTION OF THE DRAWINGS

A more complete appreciation of the exemplary aspects of the invention and many of the attendant advantage thereof will be readily obtained as the same becomes better understood by reference to the following detailed description when considered in connection with the accompanying drawings, wherein.

DETAILED DESCRIPTION OF THE EMBODIMENTS

Figure 1A:
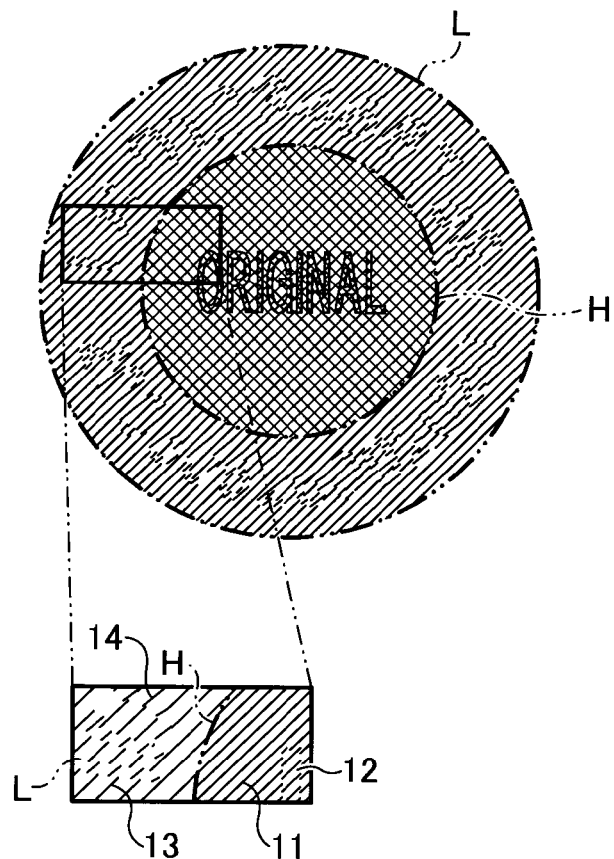
FIG. 1A is a schematic diagram illustrating an original image on an image display medium according to an embodiment of the present invention.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, an image display medium according to an embodiment of the present invention is described.

Referring to FIG. 1A, an original image to be displayed on an image display medium includes a high density region H (also referred to as a first region) and a low density region L (also referred to as a second region). The original image is a monochrome image and includes a halftone dot image. The image display medium in the embodiment is a print sheet. However, the image display medium is not limited thereto and can be an overhead projector sheet, a display medium, etc.

The high density region H includes a first composite image configured with line images which are not resolved (also referred to as irreproducible line images) when a duplicate is made using a copier. The first composite image includes a first display image and a first latent image. The first display image incorporates the first latent image therein. The first display image includes a line image having a first linearity. The first latent image includes another line image having a second linearity.

Figure 2:
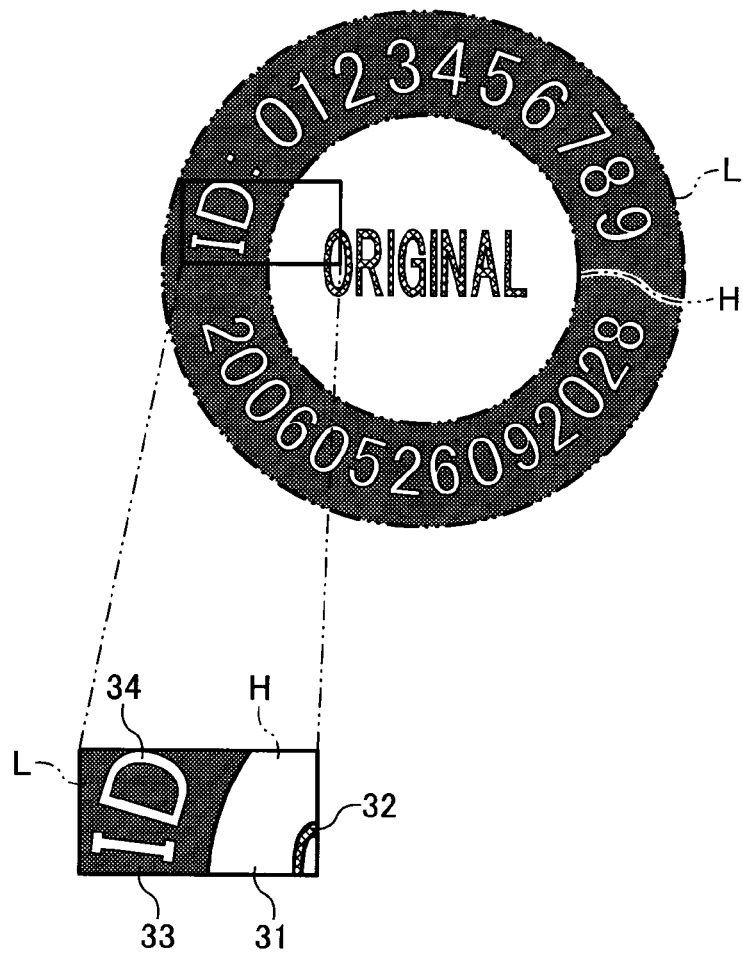
FIG. 2 is a schematic diagram illustrating a latent image in the original image of FIG. 1A.

The first display image is capable of having a main image such as character information and an image. However, the first display image is assumed to exclude the image in the embodiment for the sake of simplification. The first latent image, on the other hand, is assumed to have characters "ORIGINAL" as the image to be displayed on the original as shown in FIG. 2 which will be described later. As shown in FIG. 1A, the first display image and the first latent image are partially enlarged and illustrated as a first partial display image 11 and a first partial latent image 12, respectively.

By contrast, the low density region L includes a second composite image configured with line images which are resolved (also referred to as reproducible line images) when a duplicate is made by a copier. The second composite image includes a second display image and a second latent image. The second display image incorporates the second latent image therein. The second display image includes a line image having a third linearity. The second latent image includes another line image having a fourth linearity.

The second display image is capable of having the main image such as the character information and the image. However, the second display image is assumed to exclude the image in the embodiment for the sake of simplification while the second latent image, for example, has a character image designating information relating to the original. As shown in FIG. 1A, the second display image and the second latent image are partially enlarged and illustrated as a second partial display image 13 and a second partial latent image 14, respectively.

Figure 1B:
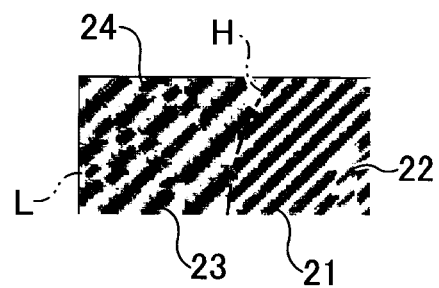
FIG. 1B is an enlarged partial view partially illustrating the original image of FIG. 1A as seen when observed through an optical system.

When the first partial display image 11, the first partial latent image 12, the second partial display image 13 and the second partial latent image 14 are observed through a lenticular lens 20 (described in FIG. 3) as first and second common optical systems, each of the images will be seen as shown in FIG. 1B.

FIG. 1B illustrates a first optical display image 21, a first optical latent image 22, a second optical display image 23, and a second optical latent image 24 which are enlarged views of the first partial display image 11, the first partial latent image 12, the second partial display image 13, and the second partial latent image 14, respectively, as seen when observed through the lenticular lens 20.

The first optical display image 21 of the high density region H includes a moiré pattern with thick oblique stripes in a straight line shape corresponding to the first display image having the irreproducible line image. The first optical latent image 22 of the high density region H includes another moiré pattern with stripes corresponding to the first latent image having the irreproducible line image. The moiré pattern of the first optical latent image 22 has narrower stripe intervals than that of the first optical display image 21. The stripes in the moiré patterns of the first optical display image 21 and the first optical latent image 22 are at different angles. The first optical latent image 22, for example, includes an upper left portion of the character image "ORIGINAL" as shown in FIG. 1B. The moiré patterns have stripes of which size and inclination can be varied by adjusting line, angle, shape, and density of the halftone dot image thereof, for example.

The second optical display image 23 of the low density region L includes a moiré pattern with thick oblique stripes corresponding to the second display image having the reproducible line image. The second optical latent image 24 of the low density region L includes another moiré pattern with stripes corresponding to the second latent image having the reproducible line image. The moiré pattern of the second optical latent image 24 has narrower stripe intervals than that of the second optical display image 23. The stripes in the moiré patterns of the second optical display image 23 and the second optical latent image 24 are at different angles. The second optical latent image 24, for example, includes "ID", which is a portion of the character information "ID:0123456789" as shown in FIG. 1B.

The reproduction of a pattern and an image by the copier can be varied depending on the density of the line image. For example, when the pattern includes a halftone dot image and a line image with at least 300 lpi (lines per inch), the pattern can be condensed in the course of reproduction by a normal printer. In other words, the pattern cannot be reproduced by the normal copier. Therefore, the image in the high density region H, which is not reproduced by the copier, has a larger number of lines (e.g., lines per inch) than that in the low density region L, which is reproduced by the copier.

Referring to FIG. 2, the high density region H includes the characters "ORIGINAL" as the latent image, and the low density region L includes the character information relating to the original as the character image according to the embodiment. The character information, for example, is an original identifier such as "ID:0123456789" identifying the original, and preparation information such as "20060526092028" specifying year, date, and time of preparation of the original.

As shown in FIG. 2, the high density region H and the low density region L are partially enlarged. The high density region H includes a third partial display image 31 and a third partial latent image 32. The low density region L includes a fourth partial display image 33 and a fourth partial latent image 34. The third partial display image 31, the third partial latent image 32, the fourth partial display image 33 and the fourth partial latent image 34 correspond to the first partial display image 11, the first partial latent image 12, the second partial display image 13 and the second partial latent image 14 of FIG. 1A, respectively.

Figure 3:
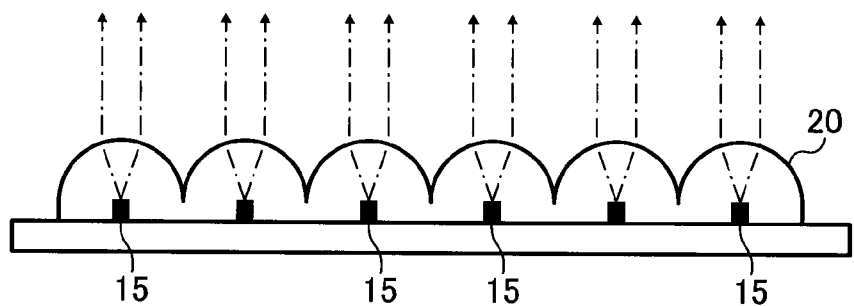
FIG. 3 is a schematic diagram illustrating a lenticular lens functioning as the optical system.

Referring to FIG. 3, the lenticular lens 20 includes a plurality of cylindrical lenses disposed along one dimension. Each of the plurality of cylindrical lenses has a centerline 15 in a middle thereof. Consequently, a plurality of centerlines 15 is enlarged to be displayed, and a moiré pattern is generated. For example, the first partial display image 11, the first partial latent image 12, the second partial display image 13 and the second partial latent image 14 of FIG. 1A are seen as FIG. 1B when observed through the lenticular lens 20.

Figure 4A:
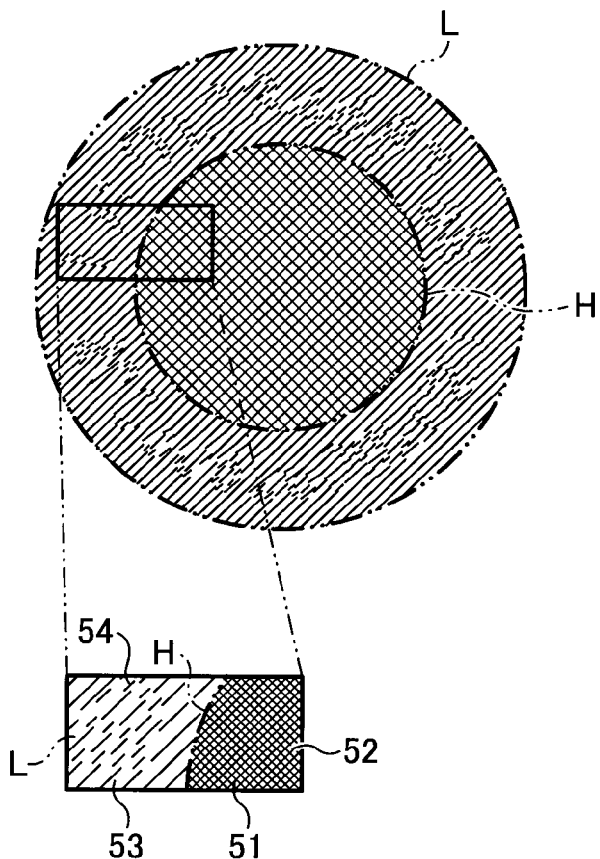
FIG. 4A is a schematic diagram illustrating a duplicate image on the image display medium when the original image of FIG. 1 is copied.

Referring to FIG. 4A, a duplicate image of the original image of FIG. 1A is illustrated. The duplicate image is an image displayed on the image display medium when the original image of FIG. 1A is copied. As shown in FIG. 4A, the duplicate image includes the high density region H and the low density region L, and is partially enlarged. The high density region H includes a first copied display image 51 and a first copied latent image 52. The low density region L includes a second copied display image 53 and a second copied latent image 54. The first copied display image 51, the first copied latent image 52, the second copied display image 53 and the second copied latent image 54 correspond to the first partial display image 11, the first partial latent image 12, the second partial display image 13 and the second partial latent image 14, respectively. When the first copied display image 51, the first copied latent image 52, the second copied display image 53 and the second copied latent image 54 are observed through the lenticular lens 20 of FIG. 3, each of the images is seen as shown in FIG. 4B.

Figure 4B:
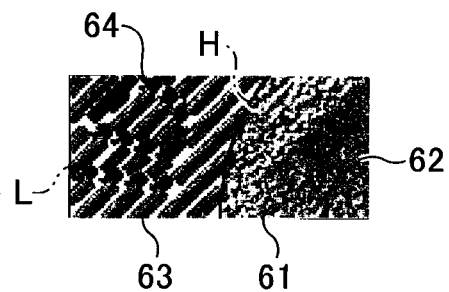
FIG. 4B is an enlarged partial view partially illustrating the duplicate image of FIG. 4A as seen when observed through the optical system.

FIG. 4B illustrates a first copied optical display image 61, a first copied optical latent image 62, a second copied optical display image 63, and a second copied optical latent image 64 which are enlarged views of the first copied display image 51, the first copied latent image 52, the second copied display image 53 and the second copied latent image 54, respectively, as seen when observed through the lenticular lens 20. As shown in FIG. 4B, the first copied optical display image 61 and the first copied optical latent image 62 are positioned in the high density region H while the second copied optical display image 63 and the second copied optical latent image 64 are positioned in the low density region L.

The second copied optical display image 63 and the second copied optical latent image 64 include the moiré patterns. Since the second partial display image 13 and the second partial latent image 14 include the producible line images that are reproduced by copying the original image, the moiré patterns on the second copied optical display image 63 and the second copied optical latent image 64 are at least substantially the same as those on the second optical display image 23 and the second optical latent image 24 of FIG. 1B when observed through the lenticular lens 20. Therefore, the second latent image on the low density region L can be recognized by observing the moiré patterns so that the information relating to the original can be recognized.

By contrast, the first partial display image 11 and the first partial latent image 12 of the high density region H include the irreproducible line images that are not reproduced by copying the original image. When the duplicate image in the high density region H is seen through the lenticular lens 20 as shown in FIG. 4B, a moiré pattern cannot be recognized on the second latent image. Unlike the original image, the moiré pattern cannot be generated on the duplicate image. In other words, the characters "ORIGINAL" as the second latent image cannot be recognized. Therefore, such images as those of FIGS. 4A and 4B on the image display medium can be recognized as duplicates instead of originals.

Next, a computer terminal 80 as an image generation system according to the embodiment is described. The computer terminal 80 generates data so that the image is displayed on the image display medium. A detailed description of the computer terminal 80 will be given later with reference to FIGS. 5A and 5B.

The computer terminal 80 includes a control mechanism, not shown, having a central processing unit, not shown, a random access memory, not shown, and a read only memory, not shown. The control mechanism functions as a first mechanism and a second mechanism to respectively execute a first process and a second process which will be described below.

The first mechanism obtains data relating to the first display image, the first latent image, the second display image and the second latent image in the first process. The second mechanism generates image data of the first region, which is not reproduced by the copier, based on the data relating to the first display image and the first latent image. The image data of the first region includes the halftone dot images and the line images. When the first linearity of the first display image and the second linearity of the first latent image are enlarged by the first common optical system, different moiré patterns are generated. The second mechanism generates image data of the second region, which is reproduced by the copier, based on the data relating to the second display image and the second latent image. The image data of the second region includes the halftone dot images and the line images. When the third linearity of the second display image and the fourth linearity of the second latent image are enlarged by the second optical system, different moiré patterns are generated.

Figure 5A:
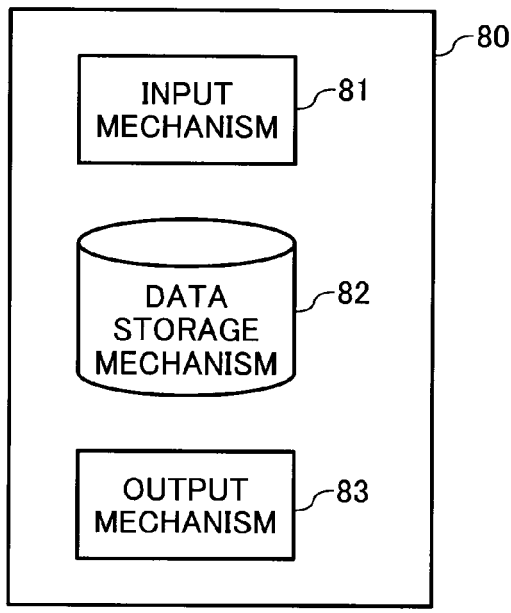
FIG. 5A is a block diagram illustrating an image generation system generating image data for the image display medium according to the embodiment of the present invention.

Referring to FIG. 5A, the computer terminal 80 also includes an input mechanism 81, a data storage mechanism 82, and an output mechanism 83, among which the data is transmitted and received. The input mechanism 81 is used to input an instruction from a user. The input mechanism 81 is, for example, a keyboard and a mouse. The data storage mechanism 82 stores, for example, data used to convert the image into the moiré pattern and the data relating to the latent image. For example, the character image "ORIGINAL" is stored as the data relating to the latent image with respect to the high density region H. The preparation information, such as date and time of preparation of the original, is generated by program data and is stored as the data relating to the latent image with respect to the low density region L. The output mechanism 83 outputs the image, and is, for example, a printer.

Figure 5B:
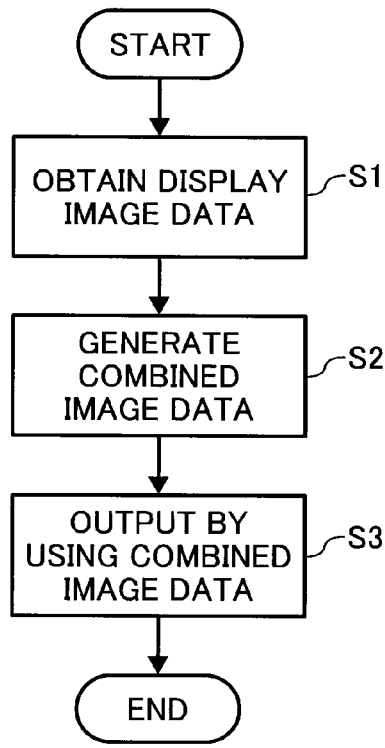
FIG. 5B is a flowchart illustrating an example procedure for executing the image generation system of FIG. 5A.

A description is now given of the operation of displaying the image on the image display medium by the control terminal 80 according to the embodiment of the present invention, with reference to the flowchart of FIG. 5B.

According to the example procedure illustrated in FIG. 5B, the computer terminal 80 obtains display image data to be printed (Step S1). For example, when the user designates the image to be printed through the input mechanism 81, the control mechanism of the control terminal 80 obtains the image data for the designated image from a data storage area. The image data includes identification data relating to the original identifier (e.g., document ID) identifying the image and specification data specifying the high density region H and the low density region L.

Next, in step S2, the computer terminal 80 generates composite image data. The control mechanism of the computer terminal 80 generates the latent image. At this time, the control mechanism obtains a time at which the image data is obtained from a built-in clock and converts the time and the document ID into character image data so as to specify onto the latent image in the low density region L. The control mechanism also specifies the character image "ORIGINAL" onto the latent image in the high density region H.

The computer terminal 80 executes an image conversion of the first display image based on the obtained image data (e.g., first display image data) in the high density region H and the data stored in the data storage mechanism 82 such that the first display image is formed by the irreproducible line image while generating the moiré pattern of the first optical display image 21. The computer terminal 80 also executes the image conversion of the first latent image based on the specified latent image data (e.g., first latent image data) in the high density region H and the data stored in the data storage mechanism 82 such that the first latent image is formed by the irreproducible line image while generating the moiré pattern of first optical latent image 22.

The computer terminal 80 executes the image conversion of the second display image based on the obtained image data (e.g., second display image data) in the low density region L and the data stored in the data storage mechanism 82 such that the second display image is formed by the reproducible line image while generating the moiré pattern of the second optical display image 23. The computer terminal 80 also executes the image conversion of the second latent image based on the specified latent image data (e.g., second latent image data) in the low density region L and the data stored in the data storage mechanism 82 such that the second latent image is formed by the reproducible line image while generating the moiré pattern of the second optical latent image 24. Thus are the images converted into the image data.

The computer terminal 80 combines the image data to generate the composite image data, and processing proceeds to step S3.

Subsequently, the computer mechanism of the computer terminal 80 outputs the image onto the image display medium by using the composite image data (Step S3). For example, the control mechanism converts the composite image data into print data and transmits it to the output mechanism 83. Upon receiving the print data, the output mechanism 83 executes a printing process so that the original image is formed on the image display medium as shown in FIG. 1A.

The embodiment of the present invention provides the following exceptional effects.

According to the embodiment of the present inventions, the high density region H of the image display medium includes the first composite image having the irreproducible line image which is not reproduced by the copier. In such image display medium, the latent image and display image on the original image can reduce or eliminate a possibility of clearly distinguishing one from another in a normal state. The latent image and the display image on the duplicate image can also reduce or eliminate the possibility of clearly distinguishing one from another in the normal state. Therefore, it is relatively difficult to predict duplication results from the original.

As described with reference to FIG. 1B, each area of the first optical display image 21 and the first optical latent image 22 in the high density region H includes the moiré pattern which is observed when the original image of FIG. 1A is seen through the lenticular lens 20. By contrast, neither of the first copied optical display image 61 and the first copied optical latent image 62 in the high density region H of FIG. 4B has the moiré pattern when observed through the lenticular lens 20 due to the differences in formation of the first composite image. Since the first composite image in the high density region H is formed by the irreproducible line image which is not reproduced by the copier, the density of the image in the high density region H can be condensed in the course of reproduction, resulting in failure to generate the moiré pattern. Thereby, it is possible to detect whether the image is a duplicate or an original. Since the latent image and the display image can be distinguished one from another based on the moiré patterns, the latent image can be recognized without display across the entire image display medium.

According to the embodiment, the image displayed on the image display medium includes the high density region H displaying the first composite image and the low density region L displaying the second composite image formed by the reproducible line image which is reproduced by the copier. Therefore, the moiré pattern is generated on the duplicate image in the low density region L. For example, failure to recognize the moiré pattern through the lenticular lens 20 on the duplicate image in the low density region L indicates a likelihood of inappropriate regeneration of the original image. The image can be identified as original or not based on the moiré pattern in the low density region L. The image can be still more accurately identified as original or not based on the moiré pattern in the high density region H.

According to the embodiment, the latent image in the high density region H includes the character image "ORIGINAL" that is visible when the image is original. However, the character image "ORIGINAL" becomes invisible when the image is copied. Therefore, the image can be determined whether the original by whether or not the character image "ORIGINAL" is visible.

According to the embodiment, the second latent image in the low density region L includes such character images as the original identifier identifying the original and the preparation information specifying year, date, and time of preparation of the original. In this way, the information relating to the original can be obtained from the duplicate image, which not only enables the source of the duplicate image to be identified but also enables leakage of the information to be tracked.

According to the embodiment, the moiré pattern includes the straight line stripes so as to be easily detected when discontinuity and disappearance thereof occur. In other words, the image can be easily authenticated.

According to the embodiment, the computer terminal 80 obtains the display image data (Step S1 of flowchart of FIG. 5B) and generates the composite image data (Step S2 of flowchart of FIG. 5B). The control mechanism of the computer terminal 80 executes the image conversion of the first display image based on the first display image data such that the first display image is formed by the irreproducible line image while generating the moiré pattern of the first optical display image 21 of FIG. 1B. The control mechanism also executes the image conversion of the first latent image based on the first latent image data such that the first latent image is formed by the irreproducible line image while generating the more pattern of the first optical latent image 22 of FIG. 1B. The control mechanism executes the image conversion of the second display image based on the second display image data such that the second display image is formed by the reproducible line image while generating the moiré pattern of the second display image 23 of FIG. 1B. The control mechanism also executes the image conversion of the second latent image based on the second latent image data such that the second latent image is formed by the reproducible line image while generating the moiré pattern of the second optical latent image 24 of FIG. 1B. The computer terminal 80 combines the image data generated by execution of the image conversions to generate the composite image data so that the image of FIG. 1A is printed on the image display medium. Thereby, the original image and the duplicate image can be easily distinguished one from another. The original image can be printed with an increase in the difficulty of predicting the duplication thereof. The computer terminal 80 generates the data capable of displaying the image, formed by the irreproducible halftone dot image and the irreproducible line image which are not reproduced by the copier, in the high density region H together with the image, formed by the reproducible halftone dot image and the reproducible line image which are reproduced by the copier, in the low density region L. Therefore, the image can be identified as an appropriately printed original or not based on whether or not the moiré pattern is visible on the image in the low density region L through the lenticular lens 20.

Moreover, the embodiment of the present invention may be modified while still obtaining the same exceptional effects as described above. A detailed description is now given of such modifications of the embodiment of the present invention.

According to the above-described embodiment, each of the high density region H and the low density region L includes the latent image as shown in FIG. 2. Alternatively, a size of the high density region H can be made very small so that the image can be identified as a duplicate or an original based on the size thereof. For example, in FIG. 6, a first hidden character section 90 can include the composite image of the display image which is not reproduced by the copier, such as a character "8", and the latent image, which shows an indication of an original such as "MASTER" therein. According to such an example, the latent image can be easily determined by using the common optical system so that the image can be identified as a duplicate or an original.

According to the above-described embodiment, each of the high density region H and the low density region L includes the latent image as shown in FIG. 2. Alternatively, the low density region L can be made very small, the latent image can consist only of the high density region H, and so forth. Thereby, a text character which is not recognized in a normal state can be used as the latent image. For example, in FIG. 6, a second hidden character section 91 can include the display image which is reproduced by the copier such as the characters "1, 2, 3, 4, 5 and 6" therein. According to such an example, the characters in the second hidden character section 91 are recognized through the common optical system. In other words, the latent image is invisible when viewed from the side.

According to the above-described embodiment, the lenticular lens 20 of FIG. 3 includes the plurality of cylindrical lenses disposed along one dimension. The second display image and the second latent image in the low density region L may include line images that can be arranged by integrally multiplying intervals of the line images of the first display image and the first latent image in the high density region H. Generally, two different optical systems are needed to observe the composite image in the low density region L and the composite image in the high density region H due to differences in densities of the line images. In the embodiment, the density of the line image generating the first composite image in the high density region H can be arranged in an integral multiple (or an approximate integral multiple) of the density of the line image generating the second composite image in the low density region L. In other words, the line image and the halftone dot image generating the second composite image in the low density region L can be arranged in an integral multiple (or an approximate integral multiple) of the interval of the line images and the halftone dot images generating the first composite image in the high density region H. As a result, the moiré patterns in the high density region H and the low density region L on the original image can be recognized by a common optical system. For example, when the intervals of the line images are integral multiples, cycles of the line images and the halftone dot images generating the moiré pattern are substantially the same as the cycles of the cylindrical lenses described in FIG. 7.

Figures 6, 7:
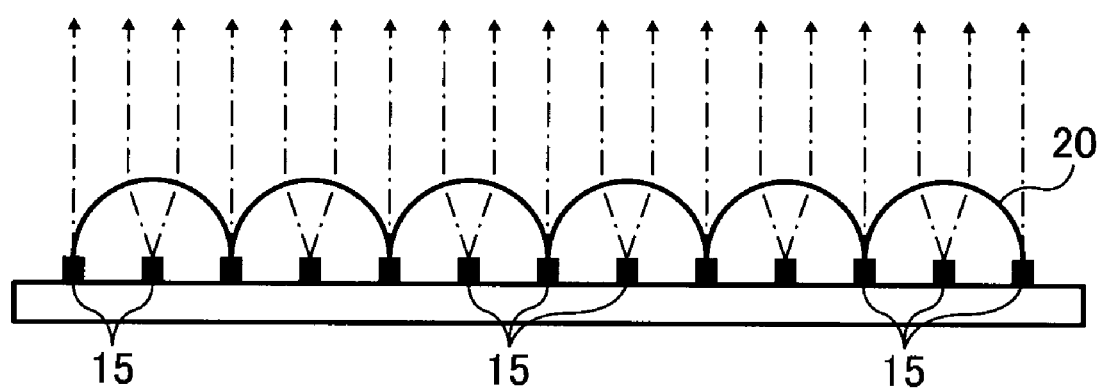
FIG. 6 is a schematic diagram illustrating an image on the image displayed medium according to a modification of the embodiment of the present invention.
FIG. 7 is a schematic diagram illustrating lines arranged by integrally multiplying an interval of adjacent lines image when as seen observed through the lenticular lens.

FIG. 7 is a schematic diagram illustrating lines arranged in integral multiples of the interval of the line images. As shown in FIG. 7, the halftone dot images positioned in the middle of the plurality of cylindrical lenses are enlarged to be displayed. By contrast, the halftone dot images positioned at the boundaries of the plurality of cylindrical lenses are not enlarged. As a result, the computer terminal 80 can utilize conversion data corresponding to such differences in vision to generate the composite image data. When an image includes a large number of lines, the image can be seen as a dark image caused by the halftone dot images positioned in the vicinity of the lenses. However, the line image can be recognized visually.

According to the above-described embodiment, the image display medium includes a monochrome image having black and white lines thereon. Alternatively, the image display medium may include a color image thereon. The color image may, for example, include a plurality of lines and halftone dot images formed by using a CMYK color model having color elements of cyan, magenta, yellow, and black, or by an RGB color model having color elements of red, green, and blue.

According to the above-described embodiment, both the high density region H and the low density region L of the image display media include the latent image. Alternatively, a plurality of latent images may be applied in the composite image. The plurality of latent images may include different color elements. For example, the first latent image and the second latent image may be formed such that the moiré patterns thereon are appeared in the color elements of magenta and cyan, respectively.

According to the above-described embodiment, the image on the image display medium is displayed in black and white lines. Alternatively, the image may be displayed in halftone dots having a variety of shapes, such as oval, circular, oblong, lozenge, triangular polygonal, any combination thereof, and so forth. Moreover, the display image and the latent image can be different shapes such that the moiré patterns thereon may be different. For example, the computer terminal 80 generates the composite image data and converts it into halftone dot images in circular, oblong, lozenge and polygonal shapes and combinations thereof, thus converting into print data in which the moiré pattern appears on the image.

According to the above-described embodiment, each of the first optical display image 21, the first optical latent image 22, the second optical display image 23 and the second optical latent image 23 of FIG. 1B has the moiré pattern in the straight line form which is observed through the lenticular lens 20. Alternatively, the moiré pattern may include lines in curve and wavy forms, for example. As long as the moiré pattern has linear stripes such as the straight lines, curve lines and wavy lines and combinations thereof, the discontinuity and the disappearance thereof can be easily identified whenever a duplicate is made, thus facilitating identification of the image as a duplicate or an original.

According to the above-described embodiment, the computer terminal 80 generates the image data in which the moiré pattern is apparent when observed through the lenticular lens 20 such as the first common optical system and the second common optical system. Alternatively, each of the first and second common optical systems may includes a plurality of at least one kind of lenses selected from, for example, cylindrical lenses, oval lenses, square pyramid lenses and polygon lenses and combinations thereof, so as to enlarge the linearity of the image. As long as each of the first and second common optical systems are disposed linearly, the linearity of the halftone dot image can be enlarged, thereby increasing the likelihood of generating the moiré pattern. The computer terminal 80 may then generate image data in which the moiré image is apparent according to the lens to be used.

Numerous additional modifications and variations of the present invention are possible in light of the above teachings, and it is therefore to be understood that, within the scope of the appended claims, the disclosure of this patent specification may be practiced otherwise than as specifically described herein.

What is claimed is:

1. An image display medium for displaying an image having a first region including a first composite image and a second region including a second composite image, the first composite image comprising:
a first display image including at least one of a first halftone dot image and a first line image having a first linearity, the first halftone dot image and the first line image having such densities as are not reproduced by copying;
a first latent image incorporated into the first display image including at least one of a second halftone dot image and a second line image having a second linearity, the second halftone dot image and the second line image having such densities as are not reproduced by copying, wherein
the first linearity produces a moiré pattern different from a moiré pattern produced by the second linearity when the first display image and the first latent image are enlarged by a first common optical system; and the second composite image comprising:
a second display image including at least one of a third halftone dot image and a third line image having a third linearity, the third halftone dot image and the third line image having such densities as are reproduced by copying; and
a second latent image including at least one of a fourth halftone dot image and a fourth line image having a fourth linearity, the fourth halftone dot image and the fourth line image having such densities as are reproduced by copying, wherein
the third linearity produces a moiré pattern different from a moiré pattern produced by the fourth linearity when the second display image and the second latent image are enlarged by a second common optical system.

2. The image display medium of claim 1, wherein the first latent image of the first region includes information identifying the image as an original.

3. The image display medium of claim 1, wherein the third halftone dot image and the third line image of the second display image in the second region satisfy the following relationship:

$$I_2 = I_1 \times n,$$

wherein $I_1$ represents an interval between adjacent dot or line images of the first halftone dot image or the first line image, $I_2$ represents an interval between adjacent dot or line images of the third halftone dot image or the third line image, and n is a positive integer, and wherein the fourth halftone dot image and the fourth line image of the second latent image in the second region satisfy the following relationship:

$$I_4 = I_3 \times n,$$

wherein $I_3$ represents an interval between adjacent dot or line images of the second halftone dot image or the second line image, $I_4$ represents an interval between adjacent dot or line images of the fourth halftone dot image or the fourth line image, and n is a positive integer.

4. The image display medium of claim 1, wherein each of the first composite image and the second composite image includes a plurality of latent images having at least one of different color halftone dot images and different color line images, and wherein, when the plurality of latent images are enlarged by the first optical system and the second optical system, different moiré patterns in different colors are produced with respect to the plurality of latent images.

5. The image display medium of claim 1, wherein each of the first common optical system and the second common optical system includes lenses that enhance the first, second, third and fourth linearities and includes a combination of a plurality of lenses selected from the group consisting of cylindrical lenses, oval lenses, square pyramid lenses, polygon lenses, and any combination thereof.

6. The image display medium of claim 1, wherein the moiré patterns include linear stripe moiré patterns.

7. The image display medium of claim 6, wherein the linear stripe moiré patterns have a form selected from the group consisting of straight forms, curved forms, wavy line forms and any combination thereof.

8. The image display medium of claim 1, wherein the first halftone dot images and the second halftone dot images of the first composite image are oval forms, circular forms, oblong forms, lozenge forms, polygonal forms, and any combination thereof.

9. A method of preparing composite image display data implemented by a computer programmed as an image generation device for displaying a first composite image in a first region and a second composite image in a second region, the method comprising:
  obtaining data relating to a first display image of the first composite image including at least one of a first halftone dot image and a first line image having a first linearity, a first latent image of the first composite image including at least one of a second halftone dot image and a second line image having a second linearity, a second display image of the second composite image including at least one of a third halftone dot image and a third line image having a third linearity, and a second latent image of the second composite image including at least one of a fourth halftone dot image and a fourth line image having a fourth linearity;
  generating, by the image generation device, image data of the first region displaying the first composite image including the first display image and the first latent image based on the data relating to the first display image and the first latent image, wherein the first linearity and the second linearity produce different moiré patterns when the first display image and the first latent image are enlarged by a first common optical system, the first region including the first halftone dot image, the first line image, the second halftone dot image and the second line image having such densities as are not reproduced by copying; and
  generating image data of the second region displaying the second composite image of the second display image and the second latent image based on the data relating to the second display image and the second latent image, wherein the third linearity and the fourth linearity produce different moiré patterns when the second display image and the second latent image are enlarged by a second optical system, the second region including the third halftone dot image, the third line image, the fourth halftone dot image and the fourth line image having such densities as are reproduced by copying.

10. An image generation system configured to prepare composite image display data for displaying a first composite image in a first region and a second composite image in a second region, the image generation system comprising:
  a first mechanism configured to obtain data relating to a first display image of the first composite image including at least one of a first halftone dot image and a line image having a first linearity, a first latent image of the first composite image including at least one of a second halftone dot image and a second line image having a second linearity, a second display image of the second composite image including at least one of a third halftone dot image and a third line image having a third linearity, and a second latent image of the second composite image including at least one of a fourth halftone dot image and a fourth line image having a fourth linearity; and
  a second mechanism configured to generate image data of the first region displaying the first composite image including the first display image and the first latent image based on the data relating to the first display image and the first latent image, wherein the first linearity and the second linearity produce different moiré patterns when the first display image and the first latent image are enlarged by a first optical system, the first region including the first halftone dot image, the first line image, the second halftone dot image and the second line image having such densities as are not reproduced by copying, and further configured to generate image data of the second region displaying the second composite image including the second display image and the second latent image based on the data relating to the second display image and the second latent image, wherein the third linearity and the fourth linearity produce different moiré patterns when the second display image and the second latent image are enlarged by a second optical system, the second region including the third halftone dot image, the third line image, the fourth halftone dot image and the fourth line image having such densities as are reproduced by copying.

11. The image display medium of claim 3, wherein n>1.

12. The image display medium of claim 1, wherein a moiré pattern of first latent image has narrower stripe intervals than a moiré pattern of the first display image.

13. The image display medium of claim 1, wherein an angle of a moiré pattern of the second latent image and an angle of a moiré pattern of the second display image are different.

14. The image display medium of claim 1, wherein at least one of the first and second common optical systems includes a plurality of cylindrical lenses disposed along one dimension, each of the plurality of cylindrical lenses including a center line in a middle thereof.

15. The image display medium of claim 14, wherein the at least one of the first and second optical systems further includes boundary lines located between the plurality of cylindrical lenses such that the boundary lines are not magnified by the plurality of cylindrical lenses.

16. The image generation system of claim 10, further comprising a generating mechanism configured to generate the second latent image.

17. The image generation system of claim 16, wherein the generating mechanism is configured to generate an original identifier as the second latent image, the original identifier identifying preparation information related to the image display data.

18. The image generation system of claim 17, further comprising a clock, wherein the generating mechanism is configured to include time information from the clock in the preparation information.

19. The image display medium of claim 1, wherein the first latent image identifies the image display medium as an original and the second latent image includes preparation information of the image display medium such that a reproduction by copying of the image display medium can be identified as a copy based on the first latent image and a source of the copy can be identified based on the second latent image.

* * * * *